US005252110A

United States Patent [19]

Nied

[11] Patent Number: 5,252,110

[45] Date of Patent: Oct. 12, 1993

[54] PREFERABLY VERTICAL AIR SEPARATOR

[76] Inventor: Roland Nied, Raiffeisenstrasse 10, D-8901 Bonstetten, Fed. Rep. of Germany

[21] Appl. No.: 736,209

[22] Filed: Jul. 26, 1991

[30] Foreign Application Priority Data

Aug. 1, 1990 [DE] Fed. Rep. of Germany ....... 4024440
Aug. 9, 1990 [DE] Fed. Rep. of Germany ....... 4025247

[51] Int. Cl.⁵ .............................................. B01D 45/12
[52] U.S. Cl. .......................................... 55/406; 55/408
[58] Field of Search .......................... 55/406, 408, 409

[56] References Cited

U.S. PATENT DOCUMENTS

| | | | |
|---|---|---|---|
| 978,450 | 12/1910 | Homans | 55/409 |
| 1,847,648 | 3/1932 | Harkom | 55/409 |
| 2,478,466 | 8/1949 | Dohrer | 55/468 |
| 4,198,218 | 4/1980 | Erickson | 55/408 |
| 4,919,795 | 4/1990 | Fujii et al. | 55/406 |
| 5,025,930 | 6/1991 | Barthelmess | 55/408 |

*Primary Examiner*—Charles Hart
*Attorney, Agent, or Firm*—Fiddler Levine & Mandelbaum

[57] ABSTRACT

A preferably vertical air separator with a rotating separator wheel upon which separating air loaded with fine goods flowing from outside towards the inside impinges, from which said separating air axially flows off through an outlet connection pipe in order to be guided to its further use, e.g. in a filter or the like, said separating wheel being provided with a downstream cover plate and a second cover plate being axially distanced therefrom, and blades being disposed between the two cover pates at their periphery, and the outlet connection delivery end averted from the separating wheel emptying into an outlet chamber the cross section of which is distinctly larger than the cross section of the said outlet connection pipe, so that there occurs an abrupt change of the cross section between the outlet connection pipe and the said outlet chamber.

19 Claims, 3 Drawing Sheets

PREFERABLY VERTICAL AIR SEPARATOR

DESCRIPTION

This invention relates to an air separator being equipped with a separator wheel. Such a separator wheel is provided with two cover plates which are kept at a predetermined distance between them while a number of blades is inserted in the vicinity of the periphery of such wheel. Such a separator wheel is rotatable around an axle supported in bearings in a stationary housing. The material to be separated consists of coarse and fine dust particles which are carried along in an air flow and which make up the product stream which is fed into the housing. This stream arrives at the separator wheel in radial direction. In the said wheel, the more coarse dust particles are separated from the air flow and the air flow leaves the said separating wheel in axial direction through an outlet pipe and carrying along the fine dust particles. The air flow carrying the fine dust particles may be guided to a filter in which air and fine dust particles are further separated.

A general aspect of the present invention is, to build up such an air separator with a view to improving the flow conditions in order to save energy, to improve the effectiveness as regards separating power, and to allow a compact construction.

It is a particular aspect of the present invention to build an air separator so that the fine-material stream branched off the product stream by means of the separator wheel until it leaves the separator housing will be guided possibly without wear. It is another aspect of this invention to be in a position to find easily indications of unavoidable wear and tear during maintenance of the air separator. The air separator, therefore, is to be as far as possible resistant to wear and tear and of easy maintenance and repair.

It is a further aspect of this invention to provide for the uniformity of the flow between the two cover plates of the separator wheel in the flow channels which are defined by the two cover plates and the blades. Within the scope of that aspect, the flow velocity is to be modified with respect to the values appearing forcibly if the two cover plates or at least the faces or planes of same facing one another are parallel, as usual with known air separators, for taking into account special operating conditions.

It is finally an aspect of this invention to design an air separator within the area of its separating wheel so that losses due to relative movements between the moving parts and the stationary components are clearly reduced. In doing so, a compact construction of the air separator is aimed at.

The most essential characteristic features of the invention will result from the patent claims and, in the following, the invention is described more in details, taking reference to the accompanying drawings.

In such drawings illustrate

Figure 1:
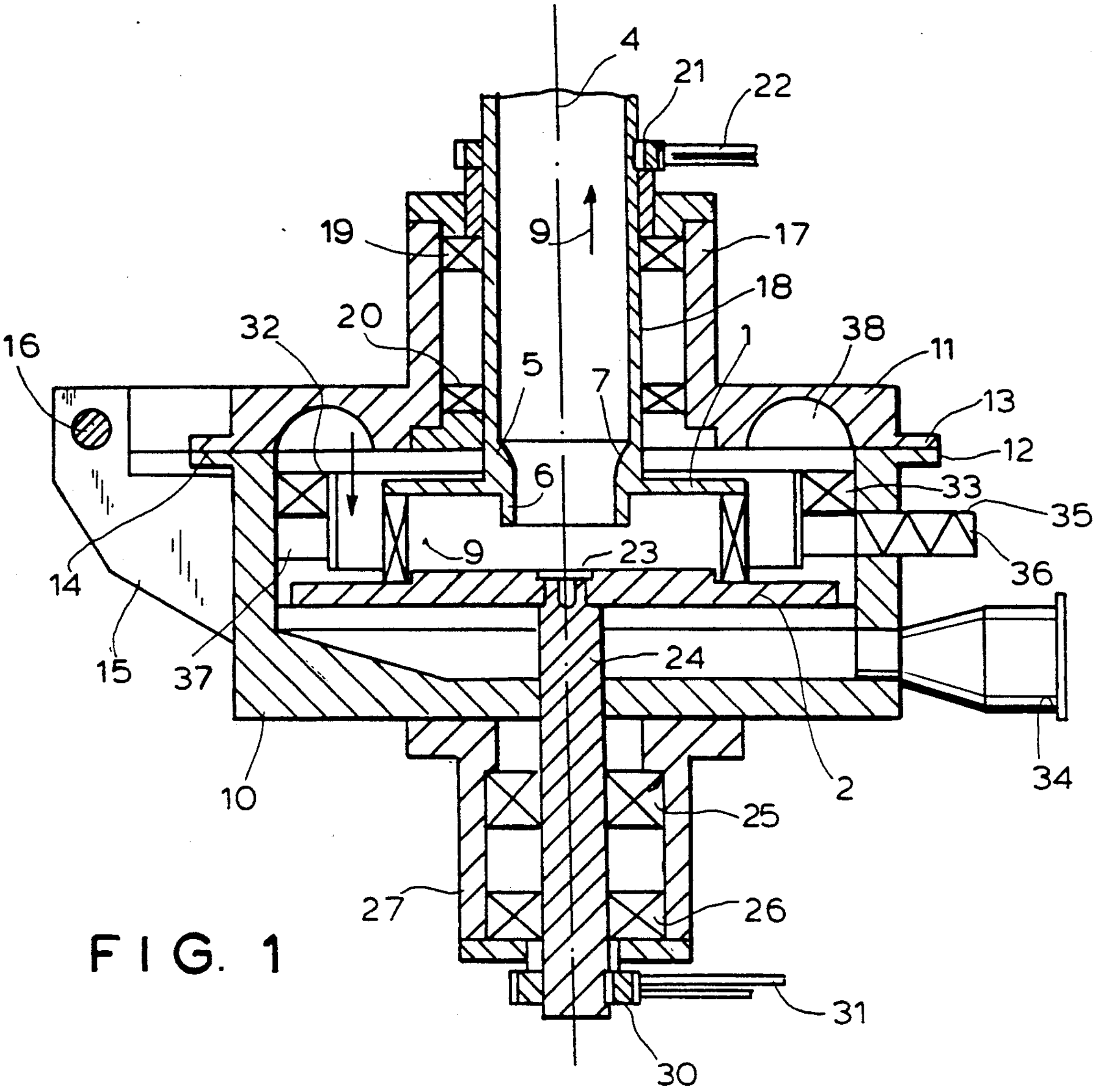
Figure 3:
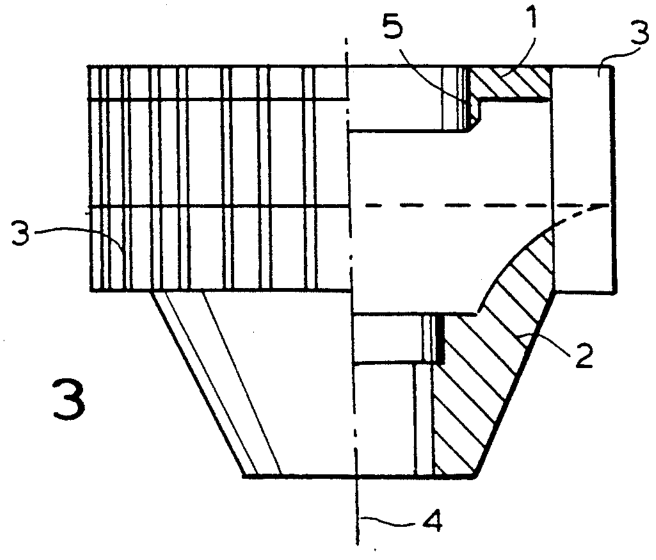
Figure 2:
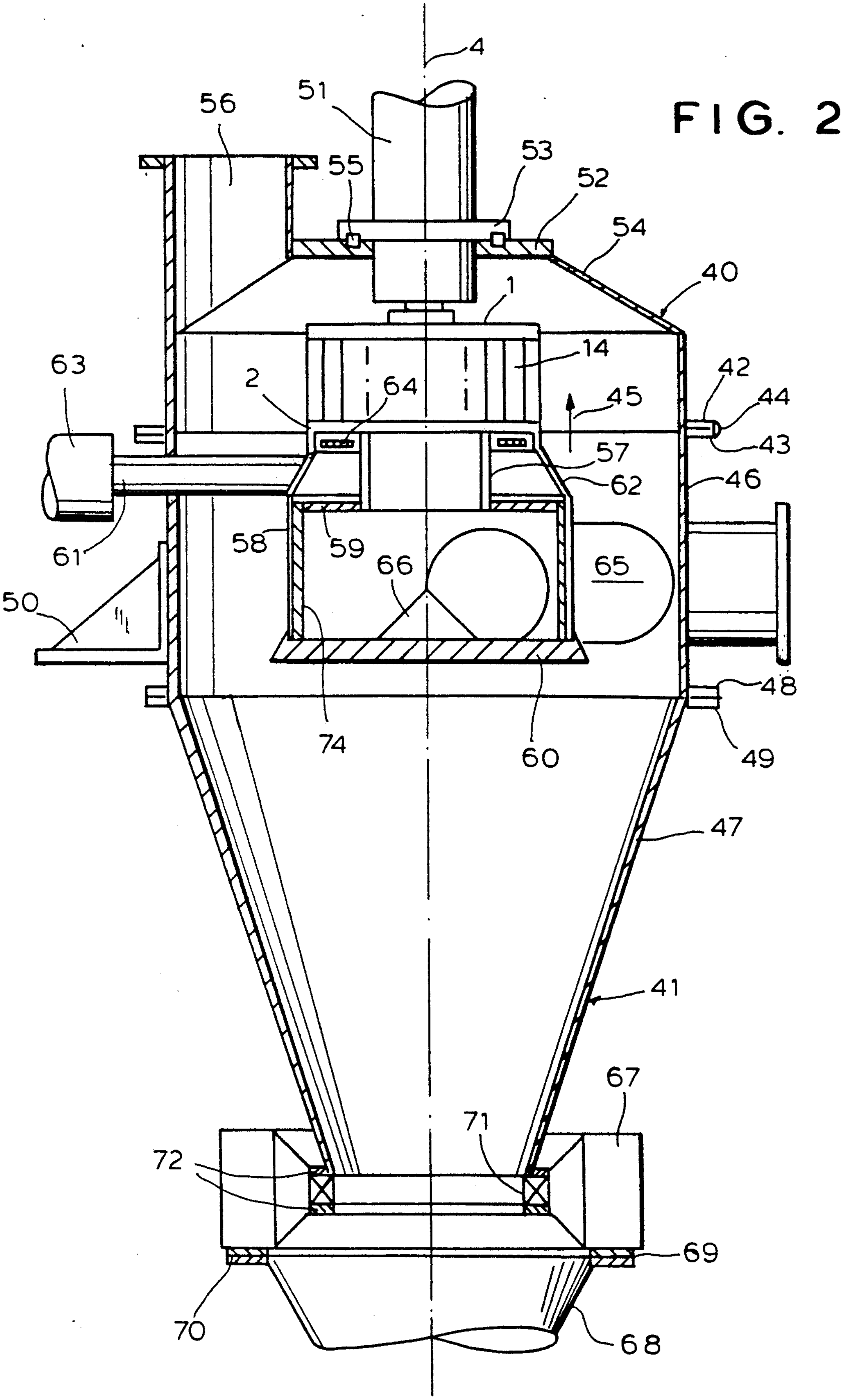
Figure 4:
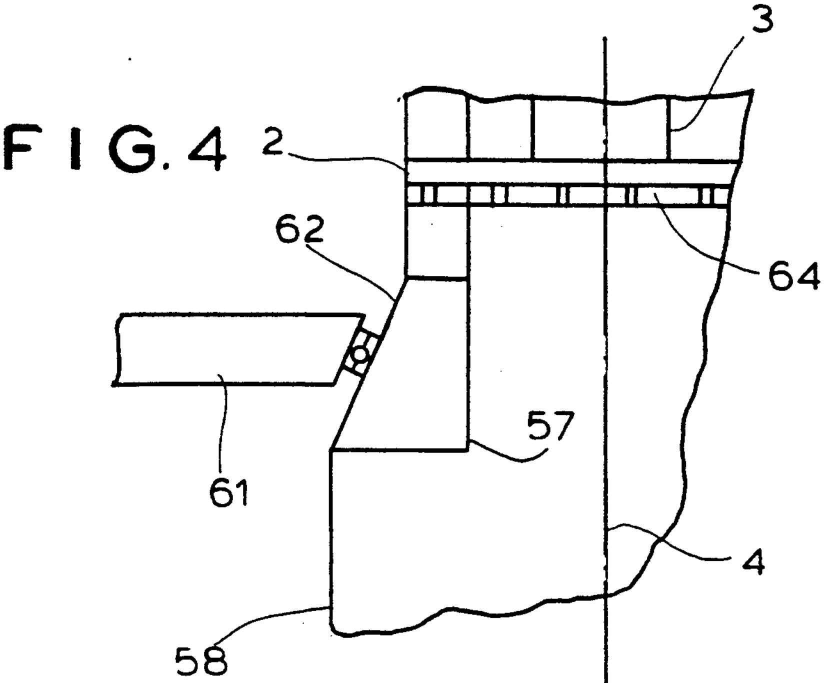
Figure 5:
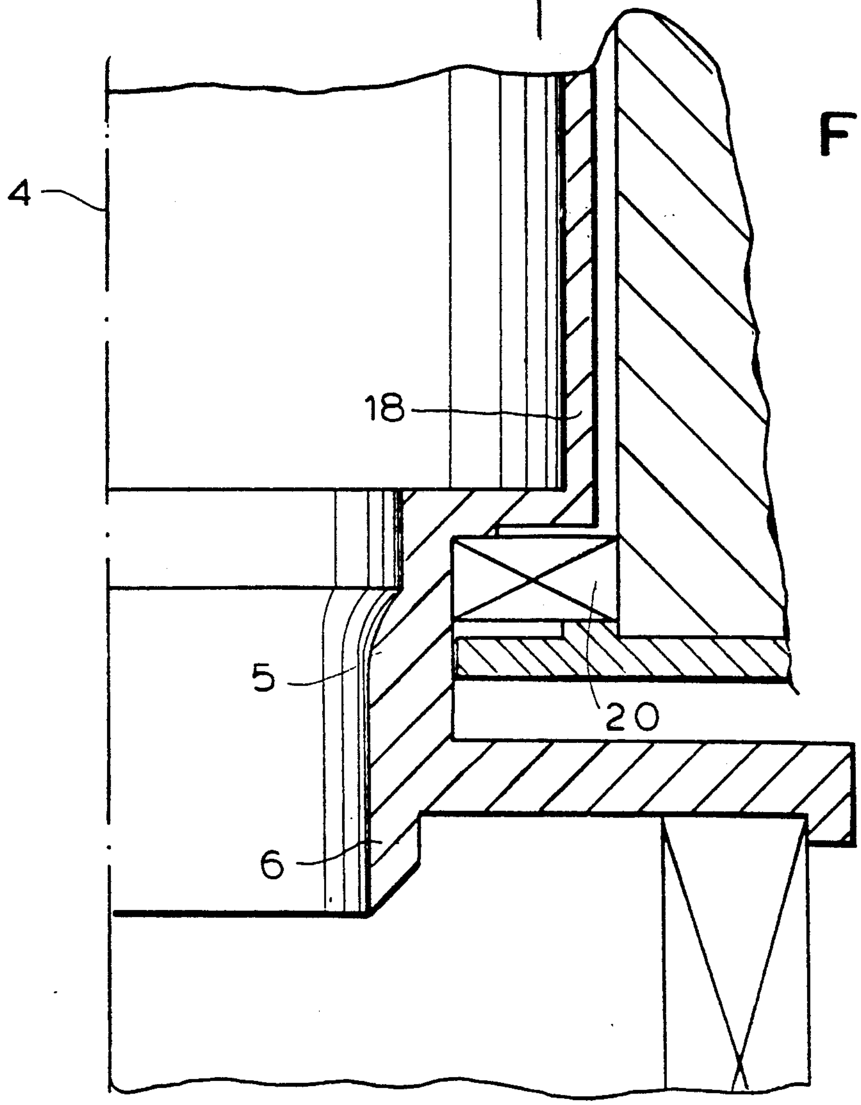

FIG. 1—for explaining, an aspect of the invention, an air separator as used in the invention, in vertical arrangement and as longitudinal, central section, the separator wheel being made in a form as usual today in general practice, FIG. 2—an air separator in a representation corresponding to FIG. 1, however in a construction in accordance with this invention, but the separator wheel still being made as usual in today's general practice, however the outlet pipe for the mixture of separator air and the at least approximately dust-like solid particles being attributed such as to take into account a partial aspect of this invention although that attribution be already known as such, FIG. 3—an air separator wheel in diagrammatic view and as vertical section, which is made in a form in accordance with one of the aspects of this invention and which may be used as such both with an air separator in accordance with FIG. 1 and with an air separator in accordance with FIG. 2, FIG. 4 and 5—Details of the above in enlarged views.

A raw gas flow with coarse and fine solid particles suspended therein was fed to a not shown separation plant. The coarse particles are separated from the raw gas flow and were removed from the separator housing. The raw gas flow containing the small particles of low weight reaches the air separator in accordance with FIG. 1 or FIG. 2, however, also those small low-weight particles being different as to their size and weight, meaning their "mass".

The air separator as illustrated in FIG. 1 is provided with a separator wheel which in turn is provided with a first, downstream upper cover plate 1, if the separator is vertically disposed, and with a second, lower cover plate 2, if the separator is vertically disposed, which is axially displaced with respect to the first one. Blades 3 which are equidistant in circumferential direction are disposed between said two cover plates 1, 2. Separator wheels of that type are known as such so that it is not necessary to give further explanations as to the shape of such blades. They are firmly disposed along the outer circumference of the downstream cover plate and the second cover plate 1, 2 as e.g. said two cover plates are clamped together by bolts and hold the blades between them. Cover plates and blades make up the separator wheel spinning around its longitudinal axis 4. This longitudinal axis 4 may stand vertically as a matter of principle and characterize a standing separator, but it may also be arranged horizontally characterizing thus a lying separator.

An outlet pipe connection 5 is firmly connected with the downstream cover plate 1. It extends into the interior of the separator wheel 1 through 3 with its section 6 being a dip pipe, in order to be connected rotationally solidly to the downstream cover plate 1 within the separator wheel. The inside of the outlet connection pipe is funnel-like expanded in an upper section 7 above the cover plate 1; the input and the outlet flows of the separator air enriched with fine dust and arriving from a separator are designated by the arrows 8, 9. The rotary motion is transmitted to the separator wheel via the second cover plate 2. The relative velocity between the flow and the outlet connection pipe 5 in the area of the flow 8, 9 is strongly reduced as compared with conventional solutions.

The separator wheel and the outlet connection pipe 5 coordinated therewith are disposed within a casing consisting of a pot-shaped bottom part 10 and an upper lid 11. The two housing parts 10, 11 are placed one upon the other on peripheral flanges 12, 13 and are detachably connected with one another by means of bolts 14 stuck through said peripheral flanges. The bottom part 10 of the casing is provided with a lateral bracket 15 in which the lid 11 is pivoted by means of a pin 16 and is tiltable around its longitudinal axis. For tilting said lid 11 around the longitudinal axis of said pin 16, the screwed bolts 14 stuck through the flanges 12, 13 are released. The lid 11 is provided with a collar-like attachment 17 in which the outlet connection pipe 5 is carried rotatably around its longitudinal axis with an upper section 18 in the form of a cylindrical tube in two axially distanced bearings 19, 20.

The outlet connection pipe is connected, with its upper end, to a not shown source of negative pressure A driving torque is introduced into the outlet connection pipe at its upper end, a typical belt pulley 21 rotationally solidly connected with the outlet connection pipe and a drive belt 22 acting upon same being shown by way of example outside of the upper end of said collar-shaped attachment 17 being detachably closed by means of a lid.

The second, the lower cover plate 2 when the air separator is seen in vertical build-up, is fixed to a bearing pin 24 by means of a pivot 23, which is carried in bearings 25, 26, rotatably around its longitudinal axis, in a likewise collarshaped attachment 27 of the bottom part 10 of the housing. The lower cover plate 2 is separately driven, the drive torque therefor being transmitted to the bearing pin 24 outside of the attachment 27, for the purpose of which, again by way of example, a belt pulley 30 upon which acts a drive belt 31 is rotationally solidly set upon the outer end of the bearing pin 24 outside of the attachment end closable by means of a detachable lid.

The belt drives 21, 22 on the one hand and 30, 31 on the other are adjusted to one another so that the two cover plates 2, 3 are driven with the same number of revolutions or at any other, predetermined speed relation.

Outside of the said blade ring 3 and concentrically thereto, a guide tube 32 is disposed and is held by means of support vanes 33 in the bottom part 10 of the housing, so that it concentrically surrounds the blade ring 3.

An inlet connection pipe 34 empties radially below the lower, second cover plate 2 immediately above the bottom face into the bottom part 10 of the housing for feeding the separating air. An inlet connection pipe 35 empties radially into the bottom 10 of the housing in the area of the guide tube 32 between the cover plates 1, 2 for the goods which are fed into the housing by means of an inlet scroll 36 disposed in the inlet connection pipe 35.

The separation air enters, while the separation wheel 1 is spinning, through the connection pipe 34, and the goods enter through the connection pipe 35, into the bottom part 10 of the housing, whereupon the separating air enriched with goods is led to an elbow 38 in the housing lid 11 through the ring channel 37 between the guide tube 32 and the wall of the bottom part 10 of the housing, in which a flow reversal takes place. The well enriched separating air reaches now the area within the guide tube 32 in order to be sucked-in from there into the separator wheel in radial direction, where the separation from too coarse grain goods is effected at the blades 3, so that fine-goods-loaded separation air is fed into the separator wheel. That fine-goods-loaded separation air is deviated in the separation wheel into an axial flow direction and is then sucked off by the dip tube 5. In a filter, switched-in downstream of the dip tube section 18, also the fine goods are filtered off the air. The too coarse goods reach the area below the second cover plate 2 passing along the second cover plate 2, in order to be further processed from there in an adequate manner.

After folding up the housing lid 11, the interior of the housing 10, 11 is easily accessible and cleaning and maintenance, in particular of the air separation wheel part distant from the lower cover plate 2, with the upper cover plate 1 and the blades 3 and, if required, its repair are easily possible.

Also in case of the air separator as illustrated in FIG. 2, the overall vertical air separator is surrounded by a housing which consists substantially of the upper housing part 40 and the lower housing part 41. The upper housing part 40 and the lower housing part 41 are provided with an outwardly directed peripheral flange 42 at the upper or 43 at the lower rim respectively. The two flanges 42, 43 are placed one upon the other in the built-in or functional condition of the separator and are fixed one upon the other by suitable means. Such suitable fixing means are e.g. bolted connections. Other detachable fixing means may be also clamps or the like.

At a practically undetermined spot of the flange periphery, the two flanges are connected to one another by a hinge joint 44 so that the upper housing part 40, after having detached the said flange connecting means, may be tilted upward in the direction of the arrow 45 with respect to the housing lower part 41, so that the housing upper part 40 becomes accessible from below and the housing lower part 41 becomes accessible from above. The housing lower part 41 in turn is made in two pieces and consists substantially of the cylindrical separator space casing 46 with the flange 43 at its upper open end and the discharge cone 47 tapering downwards. The discharge cone 47 and the separator space casing 46 have mating flanges 48, 49 at their upper or lower ends respectively, and the two flanges 48, 49 of the discharge cone 47 and of the separator space casing 46 are connected by means of detachable fixing means like the flanges 43, 44. The separator casing thus composed is suspended in support arms 50 a plurality of which are distributed possibly equidistantly around the periphery of the separator casing and engage into the cylindrical separator casing 46.

An essential part of the component parts as incorporated into the air separator are again the separator wheel with the upper cover plate 1, with the lower cover plate 2 downstream from same and axially distant thereto, and the blades of a suitable contour disposed around the outer peripheries of the two cover plates 1, 2 and firmly connected with same and equidistantly distributed around the circumference of the separator wheel. In case of the air separator under consideration here, the separator wheel is driven via the upper cover plate 1 whereas the lower cover plate 2 is the downstream cover plate.

The support of the air separator wheel comprises a shaft 51 suitably driven in adequate manner, which extends with its upper part out of the separator housing and which carries the separator wheel, with its lower end within the separator housing in a taper bore mounting, and is rotationally solidly connected therewith. The guidance of the separator wheel shaft 51 extension out of the separator housing is realized by a pair of machined plates 52, 53 which close the housing at the upper end of a housing end section 54 tapering upward in the form of a truncated cone, guide the shaft, and seal that shaft opening without impairing the rotational movements of the shaft. The upper plate 53 may suitably be shaped as a flange being rotationally solidly coordinated with the shaft 51 and being rotatably supported, by means of pivot bearings, upon the lower plate 52 which on its part is coordinated with the end section 54 of the housing. The lower face of the downstream cover plate 2 is disposed in the common plane between the flanges 43, 44 so that the separator wheel in its entirety is disposed within the tiltable housing upper part. The housing upper part 40 is additionally provided, in the area of the conical end section 54, with the product feeding connection pipe 56 which is a pipe the longitudinal axis of which is disposed parallel with respect to the axis of rotation of the separator wheel and its drive shaft 51 and which is extended as far as possible to the outside.

The separator housing 46 accommodates the tubular exit connection pipe 57 disposed equiaxially with respect to the separator wheel, which is disposed with its upper end closely below the downstream cover plate 2 of the separator wheel, however without being connected to same. At the lower end of the tubular outlet connection pipe, an outlet chamber 58 is equiaxially attached which likewise is tubularly shaped, the diameter of which, however, is substantially larger than the diameter of the said outlet connection pipe 57, at least double the diameter of the said outlet connection pipe. At the transition between the outlet connection pipe 57 and the outlet chamber 58 there occurs, therefore, a distinctly abrupt change of diameters. The outlet connection pipe is inserted into an upper cover plate 59 of the outlet housing 58, the said outlet housing 58 being closed at its lower end by means of a detachable lid 60. The constructional assembly unit consisting of the outlet connection pipe 57 and the outlet chamber 58 is carried in a plurality of support arms 61 which are equally distributed around the periphery of the said constructional assembly unit in form of a star, are firmly connected with the constructional assembly unit in the area of the outlet connection pipe, and are attached, with their other ends, to the separator housing.

The outlet connection pipe 57 is surrounded by a conical annular casing 62 whose lower, larger outer diameter corresponds, at least approximately, to the diameter of the outlet chamber, and whose upper smaller outer diameter corresponds, at least approximately, to the diameter of the separator wheel. The support arms 61 end at the conical wall of the said annular casing 62 and are firmly connected with said wall, which in turn is part of the constructional assembly unit consisting of the outlet connection 57 and the outlet chamber 58.

The support arms 61 and the annular casing 62 are parts of a scavenging air device, said scavenging air preventing matter present in the interior of the separating casing 46 from penetrating into the gap between the separating wheel respectively its lower cover plate 2 and the outlet connection pipe 57. The support arms are shaped in tubular form in order to guide the said scavenging air into the annular casing 62 and from there into the gap to be kept clear, their outer end sections penetrating the wall of the separator casing and being connected to a scavenging air source via a suction filter 63. The annular casing 62 is upwardly closed by means of an orifice plate 64 and the gap itself can be adjustable by means of an axially settable annular disk in the area between the orifice plate 64 and the lower cover plate 2 of the separator wheel 1, 2, 3.

The outlet from the outlet chamber 58 is constituted by a pipe 65 which enters the separator casing 46 from outside and is connected to the outlet chamber 58 in a tangential arrangement. A deflector cone 66 is used for lining the mouth of the fine goods delivery pipe 65 into the outlet chamber 58.

The separator air intake spiral 67 and the coarse goods delivery end 68 are coordinated with the partial casing 47 in horizontal arrangement at the lower end of the conical partial casing 47. The sense of rotation of the separator air intake spiral 67 is opposed to the sense of rotation of the separator wheel. The coarse goods delivery end 68 is detachably coordinated with the partial casing 47, the lower end of the partial casing 47 being provided with a flange 69 and the upper end of the coarse goods delivery end 61 being provided with a flange 70, and both flanges being detachably connected to one another by known means when the separator is operational.

The dispersion zone to be laid out is designated by 71. (Chamfered) flanges machined on the inner edge for a neat guidance of the flow and a simple lining are designated by 72.

Finally, a replaceable shield tube 73 being a wearing part is attached to the inner wall of the outlet connection pipe 57, and a corresponding replaceable shield tube 74 may be attached to the inner wall of the outlet chamber 58.

At the begin of the operation of the separator in the operating condition as described, separating air is introduced into the separator through the separating air intake spiral 67 along a pressure head and with a selected serviceable intake speed. Due to the intake of the separating air by means of a spiral particularly in connection with the conicalness of the partial casing 47, the separating air spirals upward into the area of the separating wheel 1 - 3. Simultaneously, the "product" consisting of solid particulate matter of varying mass is fed through the product input connection pipe 56 into the separator casing. Of this product, the coarse goods, i.e. the particle portion having a heavier mass, arrives in counter flow to the separator air into the area of the coarse goods delivery end 68 and is made available there for further processing. The fine goods, i.e. the lower mass particle portion is mixed with the separator air, arrives radially from outside to the inside through the separator wheel into the outlet connection pipe 57, into the outlet chamber 58, and finally through the fine goods delivery pipe 65 into the fine goods delivery end and from there into a filter in which the fine goods are separated from the air.

Due to the abrupt cross sectional enlargement between the outlet connection pipe 57 and the outlet chamber 58, there a conspicuous reduction of the flow speed of the fine-goods/air mixture takes place. This mixture arrives at the fine goods delivery end with a very low flow speed and produces an only low abrasion on its way. For this reason, the shield pipe 74 is a very precautionary measure only. The high flow speed prevailing in the separator wheel necessary there for the reason of a goods separation technique, still prevails however in the outlet connection pipe 57, due to which the shield pipe 73 is to be considered as being more relevant to the invention. Relevant to the invention is the abrupt diameter change with a diameter enlargement at the transition from the outlet connection pipe 57 to the outlet chamber 58. Furthermore, the separator is easy to maintain on account of the subdivision of the separator housing as above described and the coordination of the separator components to the various partial casings, and any defective components can be replaced at relatively low costs and within short servicing times.

Whereas the separator wheel with the two cover plates 1, 2 and the ring of blades 3 disposed between them is described in the general build-up in accordance with FIGS. 1, 2 in the known, usual form having parallel cover plates with parallel faces, FIG. 3 illustrates the separator wheel for the air separator according to the invention which is described in the following taking reference to the build-up of the air separator in accordance with FIG. 1.

The downstream cover plate 1 remains flat as before and is disposed in a plane which stands perpendicularly with respect to the axis of rotation 4 of the separator wheel and the longitudinal axis of the air separator, irrespective of the axis of rotation and longitudinal axis 4 being vertically or horizontally disposed. It comprises concentrically the outlet connection pipe 5. The blades 3 extend from said downstream cover plate 1 to the second cover plate. The blades 3 are connected with the two cover plates 1, 2. The lower cover plate 2 is, in deviation from prior art, conically shaped, i.e. preferably in such a manner that the distance between the second cover plate 2 and the downstream cover plate 1 enlarges, preferably continuously, from the blade ring 3 toward the interior, and again preferably in such a manner that the face of the cylinder barrel through which flows the air remains constant for any radius between the blade trailing edges and the outlet connection pipe 5. The outflow velocity reducing due to the reduced radii in case of known solutions, remains constant in the solution according to the invention.

It needs not to be specially explained that the separator wheel 1 through 3 may be formed as illustrated in FIG. 3 both in the air separator build-up in accordance with FIG. 1 and in the air separator build-up in accordance with FIG. 2.

For explaining in further details that the connection between the downstream cover plate (upper cover plate 1 in FIG. 1 or lower cover plate 2 in FIG. 2) and the outlet connection 18 (FIG. 1) or 20 (FIG. 2) may be made, a FIG. 4 has been added to FIG. 2, which illustrates the respective area in an adequate magnification.

For explaining in further details that the formation of the downflow with the abrupt diameter change in accordance with FIG. 2 may be provided also in the air separator in accordance with FIG. 1, a FIG. 5 has been added to the FIG. 1, which illustrates the respective area in an adequate magnification.

In relation to the first of the above mentioned three points it is easy to imagin that in case of FIGS. 1 and 3 the separator according to FIG. 1 includes the separator wheel in the position shown in FIG. 3 i.e. upper plate 1 of the wheel according to FIG. 3 is the same upper plate 1 shown in FIG. 1, whereas in case of FIGS. 2 and 3 the wheel shown in FIG. 3 has to be turned under an angel of 180° to come to the position as being included in the separator of FIG. 2, i.e. upper plate 1 in FIG. 3 is the lower plate in the situation of FIG. 2 and lower plate 2 in FIG. 3 is the upper plate in the position as shown in FIG. 2.

In relation of the second of the above mentioned three points it is easy to understand that chamber 58 and exhaust pipe 57 can be connected to the wheel 11, i.e. with lower plate 2 of the wheel to be turned together with the wheel, in case between the unit including wheel 11, chamber 58 and pipe 57 on the one hand and support arms 61 and pipe 65 on the other hand there is left a space. In this case in the part of the space between arms 61 and annular casing 62 could be a centering bearing 73 (FIG. 4).

In relation to the third of the above mentioned three points, according to FIG. 5, which is to be seen in combination with FIG. 1 the outlet pipe 6 is followed by a constantly and smoothly widening part 5 and this is followed by the end part 18 which is getting wider by a step close to the bearing 20 which means that parts 6 and 5 of the exhaust pipe are followed in a step by part 18 which is an equivalent to chamber 58 in FIG. 2.

I claim:

1. A preferably vertical air separator for separating course particles from fine particles in an air stream comprising a housing having an inlet means for receiving said airstream and an outlet means for discharging said airstream, a separator wheel rotatably mounted in said housing downstream of said inlet means for receiving said air stream, said separator wheel having first and second axially displaced cover plates and a plurality of blades disposed between the cover plates adjacent their peripheries, means forming an outlet chamber including an upper cover plate, and a vertical outlet connection pipe having one end adjacent said separator wheel and an opposite end inserted in the upper cover plate of said outlet chamber for guiding said air stream from said separator wheel into said outlet chamber in a straight vertical direction from said separator wheel into said outlet chamber so that the cross section of said outlet chamber adjacent the outlet connection pipe including said upper cover plate is at least twice the cross sectional area of the portion of the outlet connection pipe adjacent the outlet chamber, said outlet means being downstream of said outlet chamber for discharging said airstream from said housing.

2. An air separator in accordance with claim 1 wherein the differing cross sections of the outlet connection pipe and of the outlet chamber have similar contours and are coaxially disposed.

3. An air separator in accordance with claim 2 wherein the respective cross sections of the outlet chamber and outlet connection pipe are circular.

4. An air separator in accordance with claim 3 further comprising shield means lining the bore of the outlet connection pipe.

5. An air separator in accordance with claim 1 wherein the outlet connection pipe and the outlet chamber forming means are integrally connected to form an outlet unit, the outlet unit being mounted within the housing and below the separator wheel.

6. An air separator in accordance with claim 8 wherein there is a gap between the end of the outlet connection pipe facing the separator wheel and the cover plate of the separator wheel nearest the outlet connection pipe, and further comprising scavenger air flow means mounted between said housing and said outlet chamber forming means for conducting a scavenger air flow into said outlet chamber and then out of said outlet chamber through said gap for preventing coarse particles in said air stream from entering said chamber through said gap, and further comprising gap adjustment means mounted adjacent said outlet chamber forming means for regulating the size of said gap.

7. An air separator in accordance with claim 6 wherein said scavenger air flow means comprises means forming an annular chamber concentrically surrounding the outlet connection pipe.

8. An air separator in accordance with claim 7 wherein the annular chamber is conical and has a larger end, with a diameter at least approximately equal to the diameter of, and disposed adjacent to, the outlet chamber, and has a smaller end, with a diameter at least approximately equal to the outer diameter of, and disposed adjacent to, the separator wheel.

9. An air separator in accordance with claim 8 wherein said outlet connection pipe, outlet chamber forming means and annular chamber a integrated into a single structural unit and further comprising a plurality of radially extending arms connected between said integral unit and said housing for supporting said unit within said housing.

10. An air separator in accordance with claim 9 wherein at least one of said arms is hollow for conducting scavenging air to the annular chamber.

11. An air separator in accordance with claim 10 wherein said arms for feeding scavenging air are in the form of pipes, each having a circular cross section.

12. A vertical air separator in accordance with claim 1 wherein said housing comprises a cover and a base, said cover being pivotally mounted on said base.

13. An air separator in accordance with claim 12 wherein said cover and base have respective annular mating flanges, and further comprising removable fastener means mountable on said flanges for detachably connecting said cover and base.

14. An air separator in accordance with claim 12 wherein the separator wheel is disposed in the housing cover and the outlet connection pipe, outlet chamber and annular chamber are disposed in the housing base, and further comprising an air stream pipe connected to the housing cover with its major axis parallel the axis of the separator wheel for applying the air stream to the separator wheel.

15. An air separator in accordance with claim 1 further comprising an outlet exit pipe connected to said outlet chamber forming means and extending tangentially from the outlet chamber to the exterior of said housing for conducting said air stream, free of coarse particles, from the housing.

16. An air separator in accordance with claim 15 wherein the outlet exit pipe is connected to the outlet chamber at a region immediately above the bottom thereof, and further comprising lid means removably mounted on the bottom said outlet chamber forming means for exposing the interior of said outlet chamber when said lid means is removed.

17. An air separator in accordance with claim 12 wherein said housing base comprises an upper cylindrical subhousing having a first flange means, and a lower conically tapering subhousing having a second flange means, said upper and lower subhousings being removably connectable at said respective first and second flange means in a plane below said outlet chamber, the outlet exit pipe means being connected to the upper subhousing, and further comprising a coarse particle outlet means for expelling coarse particles from said housing and a separation air intake means for admitting air from outside the housing thereinto, each detachably mounted to the lower end of the lower subhousing.

18. An air separator in accordance with claim 17 wherein the separation air intake means comprises a separation air feed spiral means rotatably mounted above the coarse particle outlet means for urging air into the housing, the direction of rotation of said air feed spiral means being opposed to the direction of rotation of the separator wheel.

19. An air separator in accordance with claim 17 further comprising a plurality of support arms connected adjacent the cylindrical upper section of the lower subhousing and distributed about the periphery of the separator housing for enabling the housing to be mounted on an external surface.

* * * * *

UNITED STATES PATENT AND TRADEMARK OFFICE

CERTIFICATE OF CORRECTION

PATENT NO : 5,252,110

DATED : October 12, 1993

INVENTOR(S) : Nied

It is certified that error appears in the above-identified patent and that said Letters Patent is hereby corrected as shown below:

In claim 6, first line, change "claim 8" to --claim 5--.

Signed and Sealed this

Twenty-third Day of May, 2000

Attest:

Q. TODD DICKINSON

Attesting Officer

*Director of Patents and Trademarks*